(12) United States Patent
Sabourin

(10) Patent No.: US 6,926,494 B2
(45) Date of Patent: Aug. 9, 2005

(54) HYDRAULIC TURBINE WITH INCREASED POWER CAPACITIES

(75) Inventor: Michel Sabourin, Sorel-Tracy (CA)

(73) Assignee: Alstom Canada Inc., Sorel-Tracy (CA)

( * ) Notice: Subject to any disclaimer, the term of this patent is extended or adjusted under 35 U.S.C. 154(b) by 0 days.

(21) Appl. No.: 10/467,678

(22) PCT Filed: Oct. 9, 2002

(86) PCT No.: PCT/CA02/01523
§ 371 (c)(1),
(2), (4) Date: Jan. 20, 2004

(87) PCT Pub. No.: WO03/031810

PCT Pub. Date: Apr. 17, 2003

(65) Prior Publication Data
US 2004/0115047 A1 Jun. 17, 2004

(30) Foreign Application Priority Data
Oct. 11, 2001 (CA) ............................................. 2358722

(51) Int. Cl.$^7$ ................................................. F03B 3/06
(52) U.S. Cl. ...................................... 415/160; 29/889.1
(58) Field of Search ......................... 415/160, 115–118, 415/13, 17, 24, 32–36, 42, 158–163; 416/168 A, 174, 239, 244; 29/889.1–889.21

(56) References Cited

U.S. PATENT DOCUMENTS

| | | | | |
|---|---|---|---|---|
| 1,656,006 A | * | 1/1928 | Lieber | 415/158 |
| 1,942,995 A | | 1/1934 | Biggs | 253/117 |
| 2,284,295 A | | 5/1942 | Moody | 253/148 |
| 2,291,110 A | * | 7/1942 | Sharp | 415/163 |
| 2,616,663 A | * | 11/1952 | Alm | 415/160 |
| 2,972,469 A | * | 2/1961 | Mayo, Jr. | 415/163 |
| 3,132,839 A | | 5/1964 | Haekal | 253/31 |
| 3,305,215 A | | 2/1967 | Swiecicki et al. | 253/117 |
| 3,398,696 A | | 8/1968 | Sproule | 103/103 |
| 3,973,869 A | * | 8/1976 | Doll et al. | 415/160 |
| 4,120,602 A | | 10/1978 | Megnint | 415/1 |
| 4,146,351 A | | 3/1979 | Koeller | 415/116 |
| 4,242,289 A | | 12/1980 | Blum | 261/93 |
| 4,575,307 A | | 3/1986 | Shinohara | 415/150 |
| 4,780,051 A | | 10/1988 | Fisher, Jr. | 415/116 |
| 4,867,636 A | | 9/1989 | Sauron et al. | 415/160 |
| 5,082,425 A | | 1/1992 | Reil et al. | 416/188 |
| 5,261,787 A | | 11/1993 | Morgunov | 415/208 |
| 5,322,412 A | * | 6/1994 | Erlach | 415/1 |
| 5,441,384 A | | 8/1995 | Gokhman | 415/161 |
| 5,471,965 A | | 12/1995 | Kapich | 123/565 |
| 5,823,740 A | | 10/1998 | Cybularz et al. | 415/115 |
| 5,879,130 A | | 3/1999 | Beyer et al. | 415/115 |
| 5,924,842 A | | 7/1999 | Beyer et al. | 415/115 |

(Continued)

FOREIGN PATENT DOCUMENTS

| | | |
|---|---|---|
| EP | 0786594 | 7/1997 |
| JP | 5 8195075 | 11/1983 |

Primary Examiner—Edward K. Look
Assistant Examiner—Richard A. Edgar
(74) Attorney, Agent, or Firm—Baker & Hostetler LLP

(57) ABSTRACT

A hydraulic turbine with increased power capacities for new or existing hydroelectric installations. The turbine has a larger axial runner wheel and a reshaped runner ring peripherally extending around the runner wheel. A draft tube with a larger elbow section extends on a downstream side of the runner ring. A water supply port extends around a rotation axis of the runner wheel on an upstream side of the runner ring, and is adapted to produce a centripetal water flow swirling around the rotation axis of the runner wheel. A turning passageway extends between the water supply port and the runner ring, and is adapted to guide and redirect the centripetal water flow in a substantially axial direction of the runner wheel. An axial distributor extends between the turning passageway and the runner ring.

19 Claims, 4 Drawing Sheets

U.S. PATENT DOCUMENTS

| | | | |
|---|---|---|---|
| 5,924,844 A | 7/1999 | Cybularz et al. | 415/115 |
| 5,941,682 A | 8/1999 | Cybularz et al. | 415/115 |
| 5,954,474 A * | 9/1999 | Fisher et al. | 415/17 |
| 5,997,242 A | 12/1999 | Hecker et al. | 415/72 |
| 6,036,434 A | 3/2000 | Ray et al. | 415/111 |
| 6,095,749 A | 8/2000 | Beyer et al. | 415/115 |
| 6,114,773 A | 9/2000 | Kouris | 290/52 |
| 6,152,684 A | 11/2000 | Ferme et al. | 415/1 |
| 6,155,783 A | 12/2000 | Beyer | 416/90 |
| 6,227,798 B1 | 5/2001 | Demers et al. | 415/115 |
| 6,247,893 B1 | 6/2001 | Beyer et al. | 415/115 |
| 6,524,063 B1 * | 2/2003 | Beyer et al. | 415/115 |

* cited by examiner

HYDRAULIC TURBINE WITH INCREASED POWER CAPACITIES

FIELD OF THE INVENTION

The present invention relates to hydroelectric turbine installations, and more particularly to a hydraulic turbine with increased power capacities and a method of refurbishing an existent hydraulic turbine to increase its power capacities while being fish friendly.

BACKGROUND

Many existing hydroelectric installations are based on Francis turbines, as illustrated in FIG. 1. In these classical installations, the runner wheel 2 turns in the center of a spiral case 4. A stayring 6 with stay vanes 8 at the outlet of the spiral case 4 guides the water to the runner wheel 2. A radial distributor with wicket gates 10 behind the stay vanes 8 controls the water flow and distributes the water evenly around the runner wheel 2. The water passes through the runner wheel 2 and follows its course in a draft tube 12.

Such types of installations are often not very fish friendly due to the reduced dimensions of the water passage through the turbine, the speed of the water flow, the water pressure variations across the turbine, the shear in the water flow, etc. The many parts of the turbine which stand in the way, like the stay vanes, the wicket gates, possible axial or radial distributors, and the runner wheel, form as many hazards for the fish.

Existing methods of increasing the power of hydraulic turbines generally consist of increasing the size of the various parts of the installations, which requires more space. Unless spare space is readily available, the power of the existing installations cannot be increased easily in this way.

U.S. Pat. No. 1,942,995 (BIGGS); U.S. Pat. No. 3,132,839 (HAEKAL); U.S. Pat. No. 3,305,215 (SWIECICKI et al.); U.S. Pat. No. 3,398,696 (SPROULE); U.S. Pat. No. 4,120,602 (MEGNINT); U.S. Pat. No. 4,146,351 (KOELLER); U.S. Pat. No. 4,242,289 (BLUM); U.S. Pat. No. 4,575,307 (SHINOHARA); U.S. Pat. No. 4,780,051 (FISHER, JR.); U.S, Pat. No. 4,867,636 (SAURON et al.); U.S. Pat. No. 5,082,425 (REIL et al.); U.S. Pat. No. 5,261,787 (MORGUNOV); U.S. Pat. No. 5,441,384 (GOKHMAN); U.S. Pat. No. 5,471,965 (KAPICH); U.S. Pat. No. 5,823,740 (CYBULARZ et al.); U.S. Pat. No. 5,879,130 (BEYER et al.); U.S. Pat. No. 5,924,842 (BEYER et al.); U.S. Pat. No. 5,924,844 (CYBULARZ et al.); U.S. Pat. No. 5,941,682 (CYBULARZ et al.); U.S. Pat. No. 5,997,242 (HECKER et al.); U.S. Pat. No. 6,036,434 (RAY et al.); U.S. Pat. No. 6,095,749 (BEYER et al.); U.S. Pat. No. 6,114,773 (KOURIS); U.S. Pat. No. 6,152,684 (FERME et al.); U.S. Pat. No. 6,155,783 (BEYER); U.S. Pat. No. 6,227,798 (DEMERS et al.); and U.S. Pat. No. 6,247,893 (BEYER et al.) provide examples of various other hydraulic turbines and hydroelectric installations of the prior art.

SUMMARY

An object of the present invention is to provide a hydraulic turbine with increased power capacities, which can be used when refurbishing existing hydraulic turbines or in new hydroelectric installations.

Another object of the present invention is to provide such a hydraulic turbine which retrofit in many existing hydroelectric installations.

Another object of the present invention is to provide such a hydraulic turbine which has a reduced number of blades, vanes and similar parts in the water passage in comparison with classical turbines, and which is fish friendly at least in this respect.

According to the present invention, there is provided a hydraulic turbine with increased power capacities, comprising:

an axial runner wheel having a rotation axis;

a runner ring peripherally extending around the runner wheel;

a draft tube extending on a downstream side of the runner ring;

a water supply port extending around the rotation axis of the runner wheel on an upstream side of the runner ring, and adapted to produce a substantially centripetal water flow swirling around the rotation axis of the runner wheel;

a turning passageway extending between the water supply port and the runner ring, and adapted to guide and redirect the centripetal water flow in a substantially axial direction of the runner wheel; and an axial distributor extending between the turning passageway and the runner wheel.

According to the present invention, there is also provided a method of refurbishing an existent hydraulic turbine while increasing power capacities thereof, comprising:

removing any original radial distributor of the existent hydraulic turbine to recover axial space under a water supply port of the hydraulic turbine;

replacing any original stay vanes and wicket gates of the existent hydraulic turbine by new stay vanes having a greater height with respect to the original stay vanes, combined to a reshaping of the water supply port to accommodate the new stay vanes;

using the recovered axial space to replace an original runner wheel with a larger diameter axial runner wheel combined to a reshaping of a runner ring peripherally extending around the axial runner wheel, the axial runner wheel and the runner ring being moved downstream with respect to a level of the original runner wheel;

inserting an axial distributor upstream of the axial runner wheel;

reshaping a head of the existent hydraulic turbine to form a turning passageway between the water supply port and the axial runner wheel, adapted to redirect a centripetal water flow swirling in the water supply port around a rotation axis of the axial runner wheel in a substantially axial direction of the axial runner wheel; and reshaping a draft tube on a downstream side of the runner wheel so that the draft tube has an enlarged elbow section with respect to a narrower original elbow section.

BRIEF DESCRIPTION OF THE DRAWINGS

A detailed description of preferred embodiments will be given herein below with reference to the following drawings, in which like numbers refer to like elements.

DETAILED DESCRIPTION OF THE PREFERRED EMBODIMENTS

Figure 2:
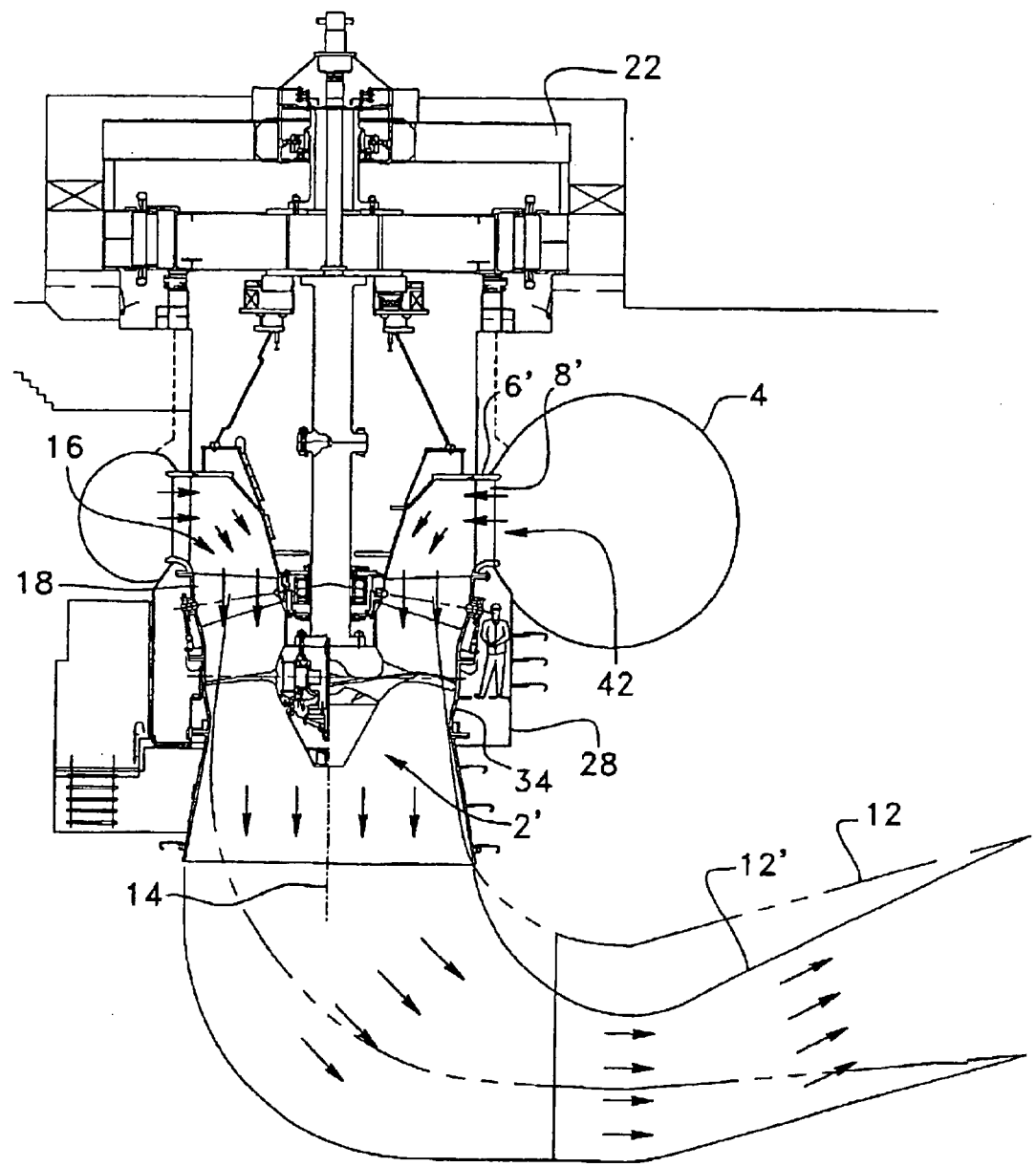
FIG. 2 is a cross-section view of a Kaplan turbine installation according to the present invention.

Referring to FIG. 2, there is shown a hydraulic turbine with increased power capacities according to the present invention. The new turbine is intended to be used in installations typically but not restrictively operating under 5 to 60 meters waterfalls with an optimum application zone of around 30 meters.

The replacement of a classical turbine by a turbine according to the present invention will likely increase the generated power from 50 to more than 100% while retrofitting in the former structure, thus reducing the required installation works. In the case of a new electric power plant, the turbine according to the present invention reduces the required axial space (or inter-axial space of the groups when several turbines are used).

Figure 1:
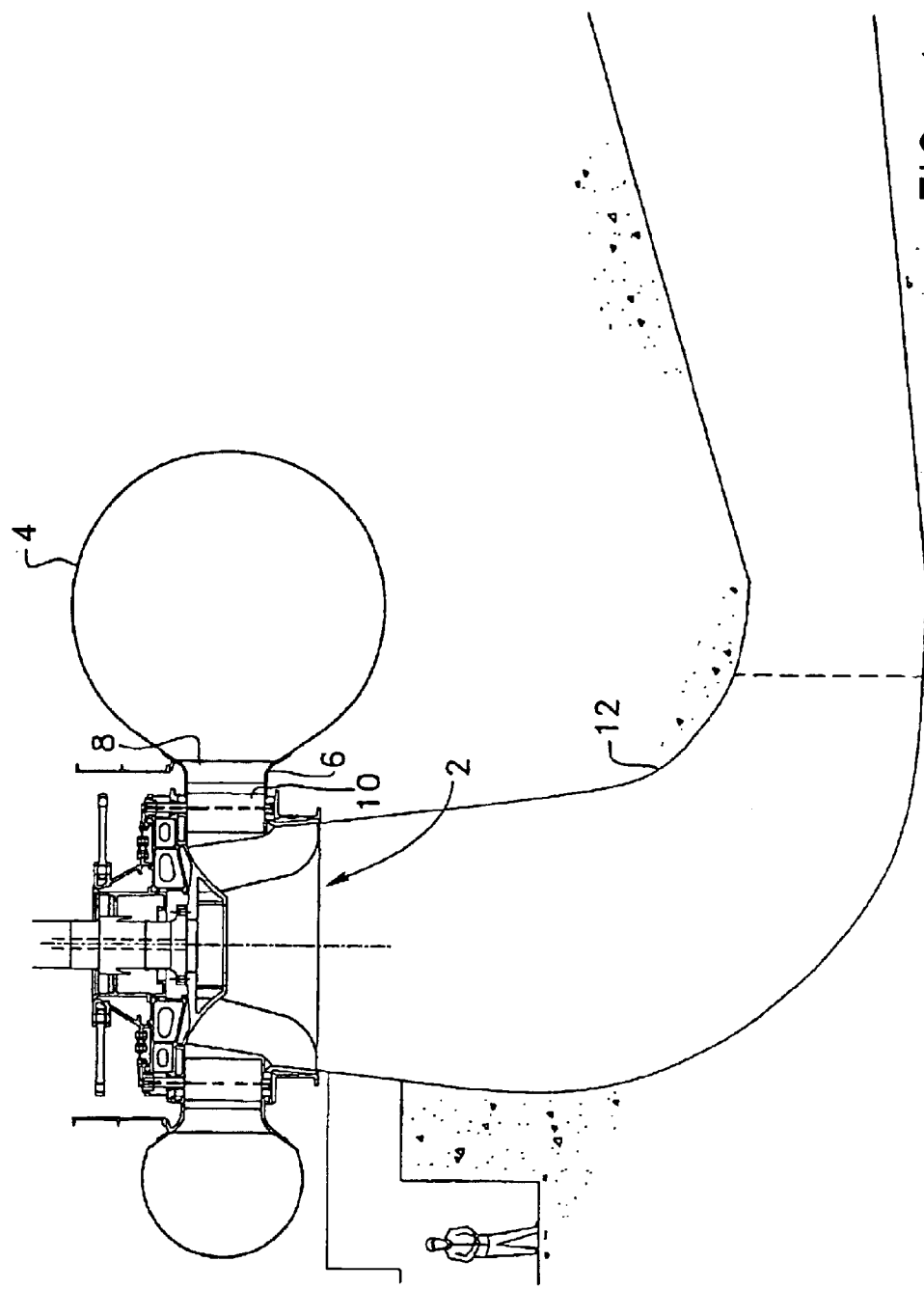
FIG. 1 is a cross-section view of a typical Francis turbine installation.

In comparison with a classical turbine as shown in FIG. 1, the turbine according to the present invention allows to increase the diameter of the runner wheel 2' while keeping the same spiral case 4 and the same occupation space in the hydroelectric installation. This increase of the runner wheel's diameter can be achieved as a result of the elimination of the radial distributor 10. Usually, as a result, the rotation speed of the wheel 2' is reduced.

The main direction of the water flow through the turbine is depicted by arrows.

In short, the hydraulic turbine according to the present invention has an axial runner wheel 2' having a rotation axis 14. A runner ring 34 peripherally extends around the runner wheel 2'. A draft tube 12' extends on a downstream side of the runner ring 34. A water supply port 42 extends around the rotation axis 14 of the runner wheel 2' on an upstream side of the runner ring 34. The water supply port 42 is arranged to produce a generally centripetal water flow swirling around the rotation axis 14 of the runner wheel 2'. A turning passageway 16 extends between the water supply port 42 and the runner ring 34 to guide and redirect the centripetal water flow in a substantially axial direction of the runner wheel 2'. An axial distributor 18 extends between the turning passageway 16 and the runner ring 34.

The water supply port 42 can be conveniently provided with a stayring 6' next to the turning passageway 16, and extending above the axial distributor 18, contrary to the stayring 6 in a typical Francis turbine as shown in FIG. 1.

The stayring 6' typically has a number of stay vanes 8' distributed around the rotation axis 14 of the runner wheel 2', near the turning passageway 16. The number of stay vanes 8' should be chosen according to the mechanical and hydraulic requirements as explained hereinafter, and may be reduced to zero in certain cases. As these requirements will often be lower in the new turbine compared to classical turbine, the number of stay vanes 8' will also often be reduced accordingly, e.g. from 24 to 12.

Stay vanes 8' having a greater height than usual are preferred in the new turbine, e.g. a height close to a smallest diameter (or height) of the water supply port 42.

Figure 3:
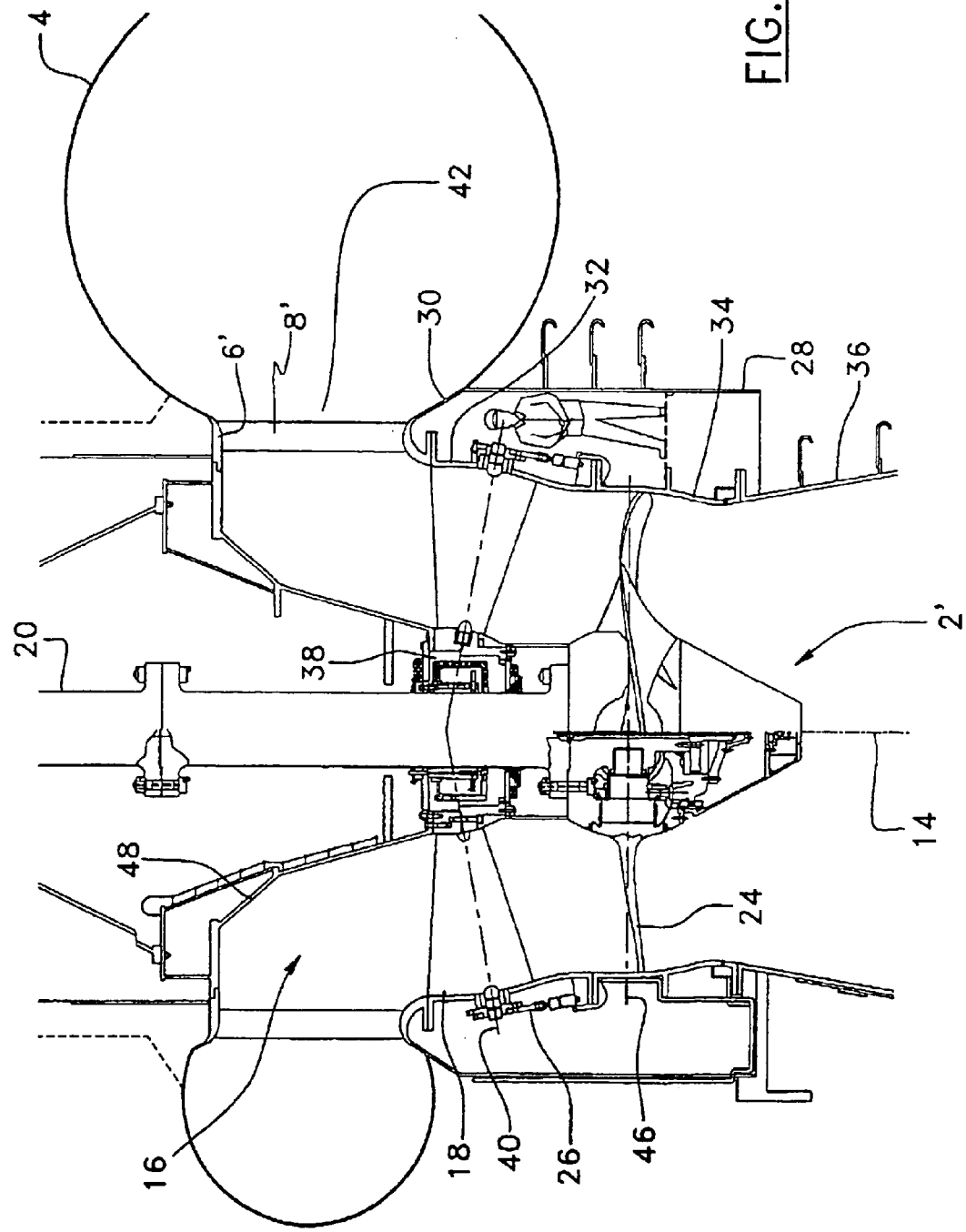
FIG. 3 is an enlarged cross-section view of a Kaplan turbine according to the present invention.

Referring to FIG. 3, water is supplied through a penstock (not shown in the Figures) communicating with the spiral case 4. The spiral case 4 and the stay vanes 8' at the water supply port 42 of the spiral case 4 cause the water flow to swirl around the rotation axis 14 of the turbine and to generate a centripetal vortex. The spiral case 4 could be replaced by a water chamber (not shown in the Figures) or any other suitable water supply structure if desired. The swirling water produces a kinetic momentum. In the meridian plane, the water flow is radial as depicted by the arrows passing through the stayring 6', as shown in FIG. 2. The stay vanes 8' have mechanical and hydraulic functions. The vanes 8' are subjected to the mechanical stress of the spiral case 4, the surrounding concrete and the other mechanical components which press against them. They are also used to correct the direction of the water flow to make it uniform. However, the number of stay vanes 8' can be reduced to zero in certain configurations.

The water flow follows its course by turning in the meridian plane and exiting from the axial distributor 18 with a direction almost parallel to the rotation axis 14 of the runner wheel 2. The turning of the water flow before reaching the axial distributor 18 is a particular feature of the new turbine.

The axial distributor 18 can be made of a number of adjustable guide vanes, for example 12 to 24, projecting around the rotation axis 14 of the runner wheel 2'. Their function is to control the flow between stopped and full load operation states with a minimum of losses. It operates in a different way from axial guide vanes of classical turbines by the fact that a very significant kinetic momentum is already initiated by the upstream components before the turn. The axial guide vanes of classical turbines have a major contribution in the generation of a vortex, which is not the case here. The profile of the guide vanes is thus different in the new turbine. The pitch of the guide vanes can be horizontal or slightly slanted, ranging for example between 0 to 20 degrees or more with respect to a rotation plane 46 of the runner wheel. In the illustrated case, they extend at an angle of 10 degrees with respect to the horizontal.

Figure 4:
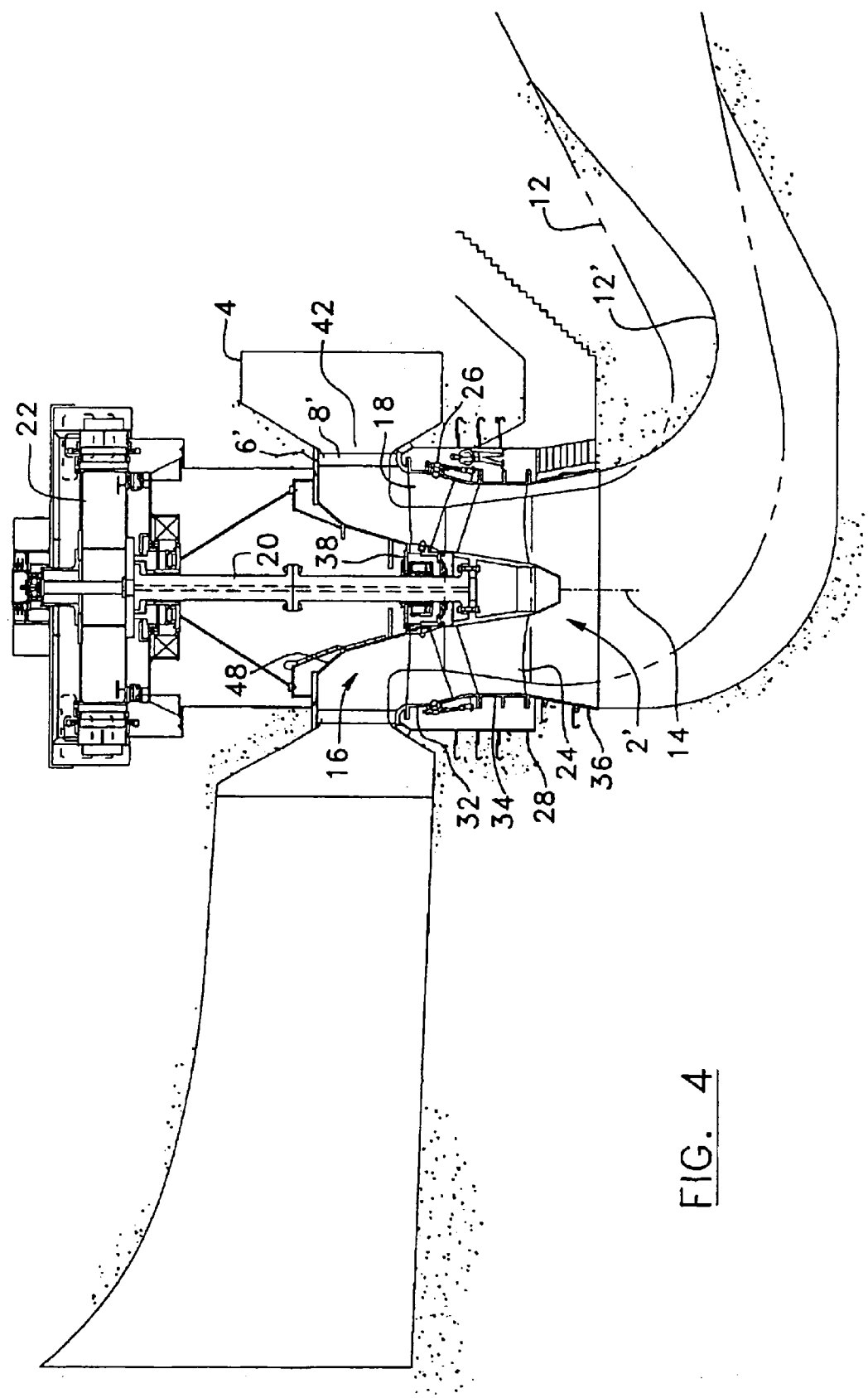
FIG. 4 is a cross-section view of a propeller turbine installation according to the present invention.

The runner wheel 2 is the motor element of the hydraulic turbine. Its purpose is to transform the power contained in the kinetic momentum of the water flow into a torque for a turbine shaft 20 coupled to an alternator 22 (as shown in FIG. 2). The turbine can be of a Kaplan type as illustrated in the Figure, thus with adjustable (tilting) runner blades 24 extending in a radial plane 46 of the runner wheel 2' (or slightly inclined with respect to the radial plane 46 if desired), or of a fixed blade type, e.g. a propeller type of turbine as shown in FIG. 4.

The new turbine can operate in a vertical axis as illustrated, or in a horizontal or slanted axis.

Referring to FIGS. 1 and 3, the steps for refurbishing an existent hydraulic turbine while increasing its power capacities according to the present invention are as follows.

Any increasing of the diameter of the runner wheel 2 in the existent turbine is limited by the wicket gates 10. These wicket gates 10 or any radial distributor are eliminated in the new turbine as shown in FIG. 3, to recover axial space under the water supply port 42.

The stayring 6 with the stay vanes 8 is replaced by a new stayring 6' with stay vanes 8' having a greater height for a greater water flow. The radial space thereby gained is used to increase the diameter of the runner wheel 2 of the new turbine. The water supply port 42 is reshaped to accommodate the new stay vanes 8'.

In the illustrated case, a larger Kaplan runner wheel 2' is used in replacement to the original runner wheel 2, which allows to move the runner wheel downstream for the insertion of the axial distributor 18 upstream to the runner wheel 2'. The runner ring 34 is also reshaped accordingly.

The upper wall of the turning passageway 16 can be conveniently formed by the bottom wall of the turbine head cover 48 which is reshaped accordingly.

From a mechanical standpoint, the mechanisms 26 for controlling the guide vanes 18 require space limited by the bottom pit liner 28 under the spiral case 4. On the other hand, the mechanical loads transmitted to the stayring 6' should be transferred to the surrounding concrete. For this purpose, a conical support ring 30 can be used to attach a lower lining portion of the spiral case 4 to the stayring 6' and to the bottom pit liner 28, thereby allowing a transfer of the loads to the concrete by the bottom pit liner 28 and by the stack formed of the axial distributor's ring 32, the runner ring 34 and the enlarging discharge ring 36. The axial distributor's ring 36 may narrow towards the runner wheel 2' to a diameter similar to a diameter of the runner wheel 2', as shown in FIGS. 2, 3 and 4. The runner ring 34 may likewise narrow as shown in FIGS. 2 and 3 or not, as shown in FIG. 4. The runner wheel 2 is preferably positioned as close as possible with respect to a guide bearing 38 axially guiding the shaft 20. To this effect, and due to the importance of the hydraulic patterns, the axis of the guide vanes 18 is slightly slanted as depicted by the dashed lines 40. The upper portion of the draft tube 12' is also reshaped. The draft tube 12' is preferably further reshaped with a larger elbow section generally aligned with the rotation axis 14 of the runner wheel 2', followed by a narrower passage communicating with the sloped and enlarging section downstream.

The axial distributor 18 may conveniently project around the guide bearing 38.

The increased dimensions of the passages in the new turbine reduce the speeds, the pressure variations and the shearing effects in the water flow, which reduces stress on the fish. Also, the reduction in the number of blades and vanes in the stayring 6', the distributor 18 and the wheel 2' combined to a reduction in the rotation speed reduce the chances of collisions between the fish and the turbine.

While embodiments of this invention have been illustrated in the accompanying drawings and described above, it will be evident to those skilled in the art that changes and modifications may be made therein without departing from the essence of this invention.

What is claimed is:

1. A hydraulic turbine with increased power capacities, comprising:
    an axial runner wheel having a rotation axis;
    a runner ring peripherally extending around the runner wheel;
    a draft tube extending on a downstream side of the runner ring;
    a water supply port extending around the rotation axis of the runner wheel on an upstream side of the runner ring, and adapted to produce a substantially centripetal water flow swirling around the rotation axis of the runner wheel;
    a turning passageway extending between the water supply port and the runner ring, and adapted to guide and redirect the centripetal water flow in a substantially axial direction of the runner wheel;
    an axial distributor extending between the turning passageway and the runner wheels; and
    a bottom pit liner peripherally extending around the axial distributor and the runner ring;
    and wherein the water supply port comprises a stay ring next to the turning passageway and a conical support ring attaching a lower part of the water supply port to the stay ring and to the bottom pit liner.

2. The hydraulic turbine according to claim 1, wherein the stay ring extends above the axial distributor.

3. The hydraulic turbine according to claim 1, wherein the stay ring comprises a number of stay vanes distributed around the rotation axis of the runner wheel, near the turning passageway.

4. The hydraulic turbine according to claim 3, wherein the stay vanes have a height close to a smallest diameter of the water supply port.

5. The hydraulic turbine according to claim 3, wherein the number of stay vanes ranges from 12 to 24.

6. The hydraulic turbine according to claim 1, wherein the axial distributor comprises adjustable guide vanes projecting around the rotation axis of the runner wheel.

7. The hydraulic turbine according to claim 6, wherein the guide vanes have an adjustment pitch range between 0 to 20 degrees with respect to a rotation plane of the runner wheel.

8. The hydraulic turbine according to claim 6, wherein the axial distributor further comprises means for controlling the guide vanes in a space limited by the bottom pit liner and a ring of the axial distributor.

9. The hydraulic turbine according to claim 1, further comprising a shaft supporting the runner wheel in the runner ring, and a guide bearing axially guiding the shaft, the runner wheel extending near the guide bearing.

10. The hydraulic turbine according to claim 9, wherein the axial distributor projects around the guide bearing.

11. The hydraulic turbine according to claim 1, wherein the runner wheel comprises runner blades slightly inclined with respect to a rotation plane of the runner wheel.

12. The hydraulic turbine according to claim 11, wherein the runner wheel is a Kaplan type of wheel.

13. The hydraulic turbine according to claim 1, further comprising a turbine head cover having a bottom wall forming an upper wall of the turning passageway.

14. The hydraulic turbine according to claim 1, wherein the draft tube has a large elbow section substantially aligned with the rotation axis of the runner wheel and followed by a narrow passage communicating with a sloped and enlarging section.

15. The hydraulic turbine according to claim 1, wherein the draft tube has an enlarging discharge ring next to the runner ring.

16. The hydraulic turbine according to claim 1, wherein the axial distributor has a peripheral ring which narrows towards the runner wheel to a diameter substantially similar to a diameter of the runner wheel.

17. A method of refurbishing an existent hydraulic turbine while increasing power capacities thereof, comprising:
    removing any original radial distributor of the existent hydraulic turbine to recover axial space under a water supply port of the hydraulic turbine;
    replacing any original stay vanes and wicket gates of the existent hydraulic turbine by new stay vanes having a greater height with respect to the original stay vanes, combined to a reshaping of the water supply port to accommodate the new stay vanes;
    using the recovered axial space to replace an original runner wheel with a larger diameter axial runner wheel combined to a reshaping of a runner ring peripherally extending around the axial runner wheel, the axial runner wheel and the runner ring being moved downstream with respect to a level of the original runner wheel;
    inserting an axial distributor upstream of the axial runner wheel;
    reshaping a head cover of the existent hydraulic turbine to form a turning passageway between the water supply port and the axial runner wheel, adapted to redirect a centripetal water flow swirling in the water supply port around a rotation axis of the axial runner wheel in a substantially axial direction of the axial runner wheel; and
    reshaping a draft tube on a downstream side of the runner wheel so that the draft tube has an enlarged elbow section with respect to a narrower original elbow section.

18. The method according to claim 17, wherein the hydraulic turbine has a bottom pit liner peripherally extending around the axial distributor and the runner ring, and the water supply port has a stay ring next to the turning passageway, the method further comprising:
    attaching a lower part of the water supply port to the stay ring and to the bottom pit liner using a conical support ring.

19. The method according to claim 18, wherein the axial distributor has adjustable guide vanes projecting around the rotation axis of the axial runner wheel, the method further comprising:
    providing means for controlling the guide vanes in a space limited by the bottom pit liner and a ring of the axial distributor.

* * * * *